United States Patent
Taylor

[15] 3,660,205
[45] May 2, 1972

| [54] | DEVICE FOR CONTINUOUSLY SEALING AND SEVERING EDGES OF FOLDED FILM |
|---|---|
| [72] | Inventor: Monroe F. Taylor, Greenville, S.C. |
| [73] | Assignee: W. R. Grace & Co., Duncan, S.C. |
| [22] | Filed: Apr. 13, 1970 |
| [21] | Appl. No.: 27,503 |
| [52] | U.S. Cl..........................................156/515 |
| [51] | Int. Cl.......................................B32b 31/26 |
| [58] | Field of Search .................156/251, 515, 380, 282 |

[56] References Cited

FOREIGN PATENTS OR APPLICATIONS

| 729,905 | 3/1966 | Canada..................................156/515 |
| 687,357 | 5/1964 | Canada..................................156/515 |
| 540,169 | 4/1957 | Canada..................................156/515 |

*Primary Examiner*—Benjamin A. Borchelt
*Assistant Examiner*—Daniel Bent
*Attorney*—John J. Toney, William D. Lee, Jr. and Edward J. Hanson, Jr.

[57] ABSTRACT

This invention is a device and a method for continuously sealing and severing two superimposed layers of heat-sealable film while controlling the cooling of the sealed and severed edge to cause strengthening of the seal and reduction of wrinkles in the film adjacent the seal. A preferred device is an inverted U-shaped electrically heated blade partially enclosed by a pair of cooling bars disposed so that the superimposed layers of sealable film pass therebetween in prolonged contact with the heated blade.

6 Claims, 5 Drawing Figures

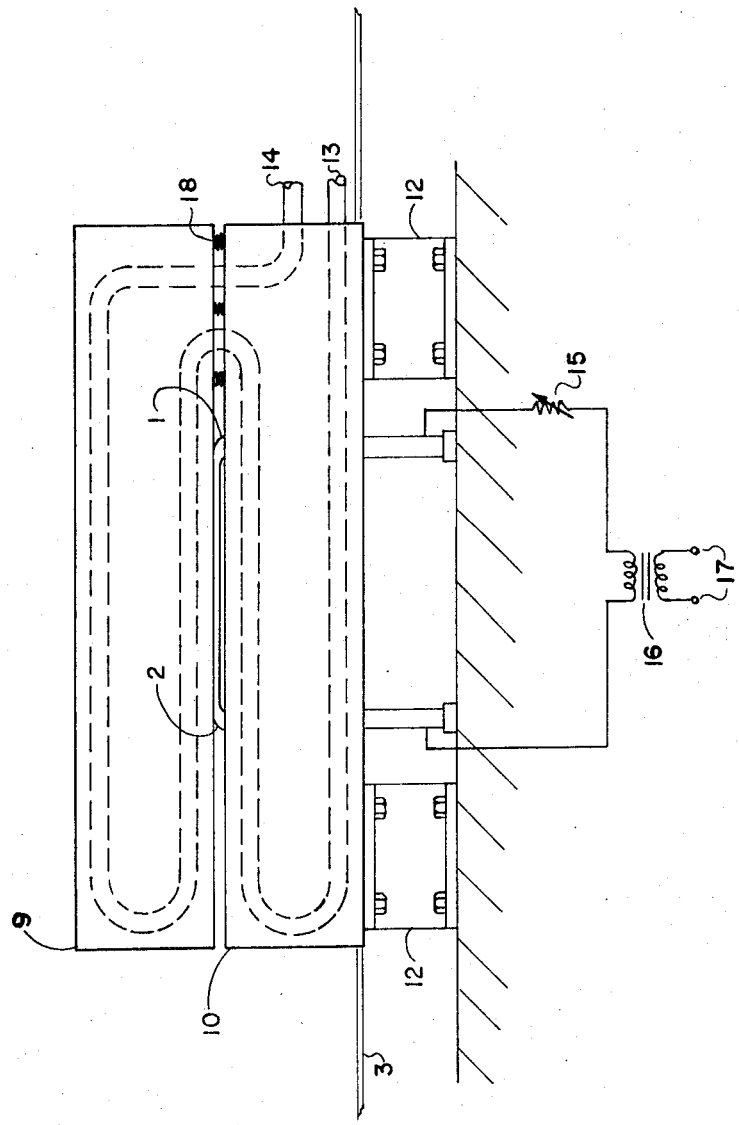

DEVICE FOR CONTINUOUSLY SEALING AND SEVERING EDGES OF FOLDED FILM

FIELD OF THE INVENTION

This invention relates to means for continuously and simultaneously sealing and severing heat-sealable film materials. In particular, the invention relates to a device and method for sealing together the edges of a heat-shrinkable, heat-sealable sheet of thermoplastic material to form a tube in which the excess material at the edges of the seal is trimmed or severed. Even more specifically the invention relates to a method and apparatus for continuously enclosing articles in a tube, and, thereafter, sealing the walls of the tube together between adjacent articles to form an enclosed package of film about the article.

DESCRIPTION OF THE PRIOR ART

Numerous methods and devices have been used in the prior art to seal and sever films. The processes and devices can be generally divided according to their mode of operation. A first mode of operation is intermittent in which a sheet of film is looped around the article to be packaged and the ends of the film are brought together. Once the film ends or edges are together a heated wire is used to heat-seal the film together after which excess film is trimmed off with a knife blade or a scissors-like device. In some instances, a combination of two heated wires can be used, one to seal the film edges together, and the other to sever the film from the source from which it is supplied and at the same time trim excess film from the edges. Typical of the intermittently operated cutting and heat-sealing devices found in the prior art are the apparatus disclosed in U.S. Pat. Nos. 3,408,245 and 3,450,587 issued to E. C. Beason and disclosed in U.S. Pat. No. 3,465,489 issued to A. C. Monaghan.

A second prior art method of using a single sheet of thermoplastic film to make packages is the continuous method in which an endless tube of material is formed in the direction in which film is drawn from a roll. Generally, in this method, as film leaves its source of supply, usually a roll, the articles to be packages are placed on one half of the film. As the article and film continue to move, the other half of the film is brought over the article and the two longitudinal edges of the film are brought together. These two edges are sealed in order to make a continuous tube; and, after sealing in the longitudinal direction, a seal is made transversely between each package, and at the same time, the film is transversely severed. If the film material is heat-shrinkable, the packages are then sent to a heat tunnel wherein the application of heat causes the film to shrink tightly about the package. In U.S. Pat. No. 3,408,242 issued to K. Rochla an apparatus is shown for welding layers of thermoplastic material together in a continuous manner in order to form an endless tube.

When using a sheet of heat-shrinkable packaging material, one problem that arises is that the application of heat to seal and sever the edges of the film also will cause shrinking and wrinkling in the area immediately adjacent the seal. Not only will this wrinkling be a detriment to the appearance of the package, it can also seriously affect the strength of the seal by preventing complete contact of the two layers being joined. This problem has been attacked in the prior art by such devices as shown in U.S. Pat. No. 3,409,494 issued to C. J. Korzinek wherein a resilient backing member is used on the working face of a severing device and the application of heat is kept localized.

Another approach to the problem of shrinkage around the seal area is disclosed in U.S. Pat. No. 3,441,460 issued to K. S. Carmichael in which the film layers are clamped together by cooled clamps and a heated tapered knife is used to sever and seal the film layers. Yet another use of differential surface temperatures in sealing and severing webs of packaging material is given in U.S. Pat. No. 3,457,132 issued to Alex Tuma et al.

The above mentioned devices for continuously sealing a tube of thermoplastic material and for controlling the shrinkage of the material at the sealed edge are unduly complicated and require, in most instances, reciprocal motion of either the severing knife, the cooling clamps, or both. Accordingly, it is an object of the present invention to provide a device for continuously sealing and severing film edges to form an endless tube which requires no reciprocating mechanism.

It is a further object of the present invention to provide a sealing and severing device for continuously forming a tube of thermoplastic material in which the seal area is free from wrinkles and puckers.

A further object of the present invention is to provide an apparatus for continuously sealing and severing layers of heat-shrinkable, thermoplastic film in which the seal is strong and reliable.

These and other objects and advantages of the present invention will become apparent from the following summary of the invention, drawings, and description of the preferred embodiment.

SUMMARY OF THE INVENTION

In its broadest aspect, the present invention comprises heated means for severing and sealing together two or more layers of thermoplastic film, and means for cooling the area immediately adjacent the heated means to prevent shrinking and puckering of the film.

In a more limited aspect, the present invention comprises a relatively thick, blade-like heated severing edge which is surrounded by cooling bars across which the film edges slide. This cooling, by conduction of heat from the film by the cooling bars, prevents premature shrinking of the film and eliminates the puckering in the seal area. The cooling bars can be spring loaded so as to achieve good contact with the film edges. In addition, the sealed edge of the film moves past the heated severing edge and maintains contact therewith for an extended period of time thus providing a thickened seal bead by the application of post-heat.

In another aspect, the present invention is a method for continuously sealing and severing layers of heat-sealable, heat-shrinkable thermoplastic material comprising the steps of severing the layers of film with the extended application of a heated, severing edge to the sealed film layers while simultaneously cooling the film layers in the area of the film immediately adjacent the point of severance.

In its most limited aspect, the present invention comprises a resistance heated blade, and upper and lower liquid-cooled cooling bars which are yieldably spaced so that at least two layers of film can pass therebetween in contact with the cooling bars and strike the leading edge of the heated blade. Additional apparatus, known to those skilled in the art, is desirable if the use of the apparatus of the present invention is to be automated. This additional apparatus will usually consist of a conveyor belt, film feeding apparatus, an apparatus for transversely sealing the walls of the tube together to form packages for each article, and film tensioning apparatus.

DESCRIPTION OF THE DRAWINGS

The present invention may be better understood by reference to the description of the preferred embodiment and to the drawings in which.

DESCRIPTION OF THE PREFERRED EMBODIMENT

Figure 3:
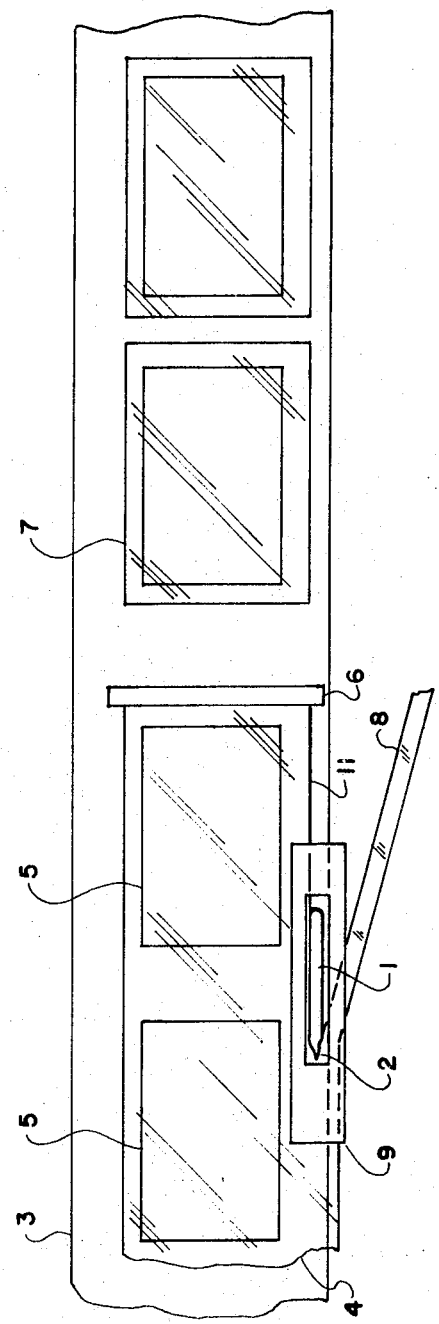
FIG. 3 is a top, plan view of the preferred embodiment showing the formation of a continuous tube of packaging material about articles which are traveling on a conveyor belt.
Figure 4:
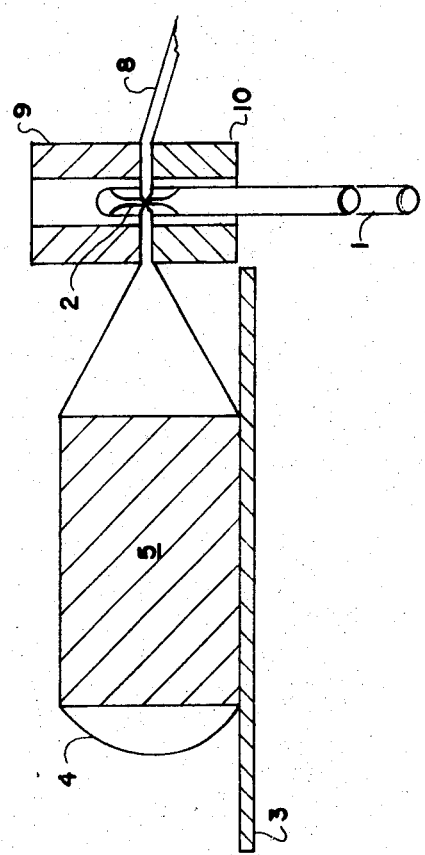
FIG. 4 is a schematic sectional view showing the severing tool in the same attitude as shown in FIG. 2 but including the cooling bars, partially wrapped article, and conveyer belt; and, FIG. 5 is a side elevation view of the preferred embodiment including a schematic representation of the cooling tubes within the cooling bars and a schematic representation of the means for heating the severing blade.

Numerous articles are today packaged in transparent, thermoplastic films. An advantage offered by this class of packaging materials is that films which are both heat-sealable and heat-shrinkable can be selected. A particularly desirable film can be prepared from polyethylene, and such a film will be heat-sealable and can be oriented for heat-shrinkability. One method of wrapping packages in a heat-sealable and shrinkable material is illustrated in FIG. 4. There, an article or product 5 is shown resting on conveyer belt 3 and enclosed by a single sheet of packaging film 4 whose edges are inserted into the space between upper cooling bar 9 and lower cooling bar 10. A top view of this arrangement is shown in FIG. 3 where a plurality of articles 5 can be seen moving from left to right on conveyer belt 3. As the articles 5 and film 4 move, the film 4 is forced against the leading edge of the severing tool 2 producing sealed seam 11 and film selvage 8. The continuous tube of film 4 which is formed around the articles 5 by the sealing and severing action of tool 2 is subsequently transversely sealed by a sealing and severing bar 6 so that individual packages 7 are formed. These packages 7 are now ready to be placed in a heating tunnel which will shrink the film tightly around the article.

Still referring to FIG. 3, it is sometimes desirable that a film tensioning or feeding device be placed to the right of the heating tool and before the sealing and severing bar 6 is encountered. This device can be a small set of pinch rolls located close to the seam 11 which guide and pull the film along. When such a tensioning device is used, it becomes necessary to put tension on selvage 8 by use of a driven pair of rollers or other suitable means.

To use the present invention in an automated, relatively fast-moving production basis, the driven rollers mentioned in the foregoing paragraph would be necessary to keep the film articles and selvage moving uniformly together without misalignment of the film. However, the apparatus and method of the present invention can readily be operated and performed by hand. Thus, a sheet of film can be manually pulled from a roll, an article 5 placed upon the film, the film 4 folded over the article as shown in FIG. 4, and the edges of the film placed or fed through the space between the upper sealing bar 9 and the lower sealing bar 10. The article, film, and selvage can then all be manually moved past and in contact with the heated severing tool 2 and the cooling bars 9 and 10. And, as before, a sealing and severing bar 6 can be used to seal the walls of the now formed tube together and form separate packages 7 as seen in FIG. 3.

Figure 1:
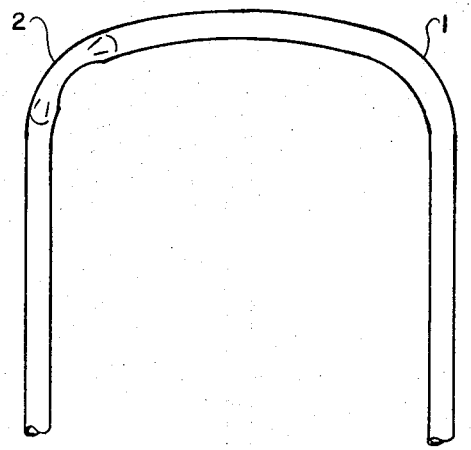
FIG. 1 is a side view of the heated, severing tool which forms part of the preferred embodiment of the present invention.
Figure 2:
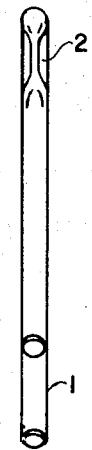
FIG. 2 is a view of the severing tool of FIG. 1 which is seen by viewing FIG. 1 from the left side.

Turning now to a more detailed description of the apparatus of the present invention, attention should be directed to FIGS. 1 and 2. There, the heated severing edge 2 of the heated tool or element 1 can be seen. Tool 1 can be formed by bending a 3/16 inch stainless steel tube into the inverted U-shape as shown. The blade or severing edge 2 is formed by crimping or pinching the leading curve of the U until it is about one-sixteenth of an inch in thickness. The trailing edge of the severing blade 2 can be further notched as shown in FIG. 1. The notching is simply to remove material from the blade and diminish the total metal area in the blade area. This concentrates the electrical resistance in the blade area and likewise concentrates the heat generated when an electrical current is passed through the tool 1.

The tool 1 is positioned with the blade 2 in a leading position so that it can engage and sever the layers of film that advance toward it. In FIG. 3 the position of the tool 1 is seen from above and it should be noted that the tool is surrounded by sealing bar 9. In FIG. 4, the edges of film which slide through the space between upper sealing bar 9 and lower sealing bar 10 can be seen being sealed and severed by the blade edge 2. The severed portion or selvage 8 can be removed through the space between the cooling bars to the right of the tool.

FIG. 5 shows a side view of the apparatus of the present invention mounted in a working position. Lower cooling bar 10 is supported by mounting brackets 12, and upper cooling bar 9 is supported in cantilever fashion by adjustable springs 18 which are carried by lower cooling bar 10. Cooling liquid may be circulated through the cooling bars to cool them. The liquid can enter inlet 13, circulate through the cooling bars, and leave through outlet 14. Chilled water makes an excellent coolant for this purpose, and the adaption of a chilling or refrigerating unit and circulating pump to the apparatus of the present invention is well within the competence of one ordinarily skilled in this art.

Still viewing FIG. 5, a preferred means of heating the blade is shown where electrical current is supplied through power source 17 to reduction transformer 16, and the amount of current supplied to the legs of tool 1 is controlled by rheostat 15. As stated above, a satisfactory U-shaped tool can be formed from 3/16 inch OD stainless steel tubing. The leading arc of the U is flattened and suitably notched to act as the blade edge 2. This flattening will raise the resistance of the tube at this point; and, when about 50 amps of current is passed through the tool at a potential of about 1.5 volts, the blade becomes heated sufficiently to seal and sever two layers of biaxially oriented polyethylene film. For different materials and for different speeds the amount of current, and consequently the heat of blade 2, will have to be adjusted.

The spacing between upper cooling bar 9 and lower cooling bar 10 is controlled by the adjustable springs 18 shown in FIG. 5. This spacing usually must be adjusted for the number of layers passing through the spacing, and for the thickness of the layers of material. The spacing must be such that the cooling bars will contact both of the film edges and will at the same time permit ease of movement of the film layers through the spacing. As can be appreciated from viewing the schematic sectional view of FIG. 4, this spacing will also depend somewhat upon the size of the article 5. These are minor adjustments considered to be well within the skill of the art.

As can be seen from viewing the apparatus of the present invention from above as in FIG. 3, the distance from the leading edge of the heated severing blade 2 to the nearest cooling surface of the cooling bars can be made small, about the order of one-eighth inch. Also, the film immediately before being severed has been cooled by the leading portion of the cooling bars 9 and 10. Thus, the application of heat is kept localized to the severed and sealed edge thus preventing any premature shrinkage or puckering along the seal.

Another advantage of the present invention can be recognized in FIG. 3. After the film edges are severed and sealed by heated edge 2, the resulting sealed edge 11 slides by the remaining portion of the tool 1, and further melting and fusing of the seal takes place. This uppermost portion of the stainless steel U-shaped member will understandably be heated both by conduction from the high resistance area 2 and by the passage of the high amperage current through the tool. The prolonged heating of the seal, or post heating of the severed and sealed together area, results in a greatly improved and strengthened seal. Again, the close proximity of the cooling bars to the sealed edge prevents shrinking and puckering.

For best results in making a straight seam and keeping the articles 5 aligned within the tube of film, the tension on the selvage 8 and the film 4 should be kept approximately the same (See FIG. 3). This can be achieved by either manually pulling selvage 8 and tube 4 at the same rate, or by pulling selvage 8 through a pair of driven pinch rolls synchronized with the movement of the articles and film on the conveyer belt 3.

As can be appreciated from the foregoing description of the preferred embodiment, the method performed by the preferred apparatus comprises broadly the steps of severing and sealing together two layers of film by a heated edge and maintaining contact between the heated edge and the seal for an extended period of time while simultaneously cooling the film in the area immediately adjacent the seal. The additional step of maintaining approximately equal tension in the selvage and in the sealed together film layers improves the ease of operation of the process.

OTHER EMBODIMENTS

While the U-shaped tool 1 shown in FIGS. 1 and 2 is a preferred and readily available and easily mountable tool, other shapes are usable and would still fall within the scope of the present invention. For instance, a wide vertical blade could be mounted in the same position as the U-shaped tool as shown in FIG. 3. This blade could have its leading edge 2 being thinner than the remaining or trailing part of the blade and also being preferentially heated. The important thing would be to insure that the film edge 11 remained in extended or prolonged contact with a hot surface of the trailing or second section of the blade to further fuse the seal on the edge while the film adjacent to the edge is kept cool.

In FIG. 4, the upper and lower edges of the film within the space between the bars 9 and 10 is seen sliding in contact with these bars. The surface of the bars which the film contacts should be smooth and free of stickiness, and, if necessary, this surface could be coated with a material such as teflon. However, any coating material in this area will diminish the transfer of heat from the film to the cooling bars. The bars are preferably made of a metal having high thermal conductivity such as aluminum or one of the aluminum alloys. However, most of the steels will have satisfactory conductivity. The cooling effect of the bars will tend to make the film slide more easily as the thermoplastic material tend to become somewhat stiffer with a reduction of temperature.

The shape of the cooling bars can be varied, it only being necessary that lower cooling bar 10 be formed so that the tool 1 can be mounted adjacent the spacing through which the two layers of film slide. Obviously the lower cooling bar must be shaped with an opening adapted to receive the severing tool when the bars are to surround the tool; and, in this instance, the upper cooling bar must have a cavity or opening adaptable to the upper portion of the severing tool. The spacing between the upper and lower bars must always be such as to allow guiding of the sealed film layers along the trailing portion of the severing and seal tool to further fuse the seal.

If the rate of sealing and severing is to be increased, the temperature of the heated severing edge will have to be increased and the cooling effect of the cooling bars should likewise be increased. To increase the amount of heat at the severing edge it will usually only be necessary to increase the flow of electrical current. To increase the cooling the temperature of the chilled water can be lowered and the rate of circulation increased. In extreme applications, a coolant such as brine, or ethylene glycol could be used.

I claim:

1. An apparatus for continuously severing and sealing together superposed layers of heat-shrinkable, heat-sealable thermoplastic sheet material comprising:
    a. a sealing and severing tool having a leading, blade-like edge for initially sealing and severing two layers of film material and having a second portion for extended contact with said severed edges, said tool being formed from electrically conductive tubing a portion of which has been flattened to form said blade-like edge;
    b. means for heating said sealing and severing tool;
    c. a lower sealing bar, said bar having an opening extending therethrough, said opening closely conforming to the shape and size of said sealing and severing tool, said bar being provided with internal passageways for liquid coolant, and said bar having at least one surface across which and in contact with said film may slidable move;
    d. an upper cooling bar, said upper bar being adapted to receive the upper portion of said severing and sealing tool, said upper cooling bar being provided with internal passageways for liquid coolant, and said upper sealing bar having at least one surface over which and in contact with thermoplastic film may slidably move; and,
    e. yieldable, adjustable means to maintain said upper and lower cooling bars in spaced apart relationship whereby as said two layers move through said space between said cooling bars the respective surfaces of the cooling bars will be contacted and the leading edge of said severing and sealing tool will be encountered.

2. The apparatus of claim 1 wherein said sealing and severing tool is shaped like an inverted U.

3. The apparatus of claim 1 wherein the means for heating said sealing and severing tool is electrical.

4. A tool for severing and sealing together superimposed layers of heat-sealable thermoplastic material comprising:
    a. a tubular member of heat-conductive material;
    b. a leading blade edge formed by flattening a portion of said tubular member; and
    c. means for heating said tubular member.

5. The tool of claim 4 wherein said tubular member is U-shaped.

6. The tool of claim 5 wherein: the leading blade edge has been formed by flattening said tubular member in one of the arcs of said U-shape; the heat-conductive material is electrically conductive; and the means for heating the tubular member is an electrical current passed therethrough.

* * * * *